(12) United States Patent
Müller et al.

(10) Patent No.: US 7,240,557 B2
(45) Date of Patent: Jul. 10, 2007

(54) SENSOR, MEASUREMENT CELL FOR USE IN A SENSOR AND A PROCESS FOR PRODUCING A MEASUREMENT CELL

(75) Inventors: Hans-Peter Müller, Fronreute (DE); Benno Kathan, Wasserburg/Bodensee (DE)

(73) Assignee: i f m electronic GmbH, Essen (DE)

( * ) Notice: Subject to any disclaimer, the term of this patent is extended or adjusted under 35 U.S.C. 154(b) by 0 days.

(21) Appl. No.: 10/787,762

(22) Filed: Feb. 27, 2004

(65) Prior Publication Data
US 2004/0200287 A1    Oct. 14, 2004

(30) Foreign Application Priority Data
Feb. 27, 2003    (DE)    ................. 103 08 820

(51) Int. Cl.
*G01L 7/00*    (2006.01)
(52) U.S. Cl. ........................................ 73/706
(58) Field of Classification Search ................ 73/700, 73/715, 706, 23
See application file for complete search history.

(56) References Cited

U.S. PATENT DOCUMENTS

| | | | |
|---|---|---|---|
| 4,617,607 A | 10/1986 | Park et al. | |
| 5,076,147 A | 12/1991 | Hegner et al. | |
| 5,551,299 A | 9/1996 | Tamai et al. | |
| 5,824,909 A | 10/1998 | Kathan et al. | |
| 5,892,156 A * | 4/1999 | Kathan et al. | ................. 73/706 |
| 5,932,857 A * | 8/1999 | Stander et al. | ............ 200/83 B |
| 6,055,864 A * | 5/2000 | Stiller et al. | ................... 73/724 |
| 6,209,399 B1 * | 4/2001 | Probst et al. | ................... 73/756 |
| 6,715,356 B2 * | 4/2004 | Gerst et al. | ................... 73/715 |
| 6,848,318 B2 * | 2/2005 | Gerst et al. | ................... 73/715 |
| 2001/0015105 A1 * | 8/2001 | Gerst et al. | ................... 73/715 |
| 2004/0149042 A1 * | 8/2004 | Gerst et al. | ................... 73/723 |
| 2005/0056097 A1 * | 3/2005 | Banholzer et al. | ............. 73/700 |

FOREIGN PATENT DOCUMENTS

| | | |
|---|---|---|
| DE | 268 523 A1 | 5/1989 |
| DE | 44 16 978 A1 | 11/1995 |
| JP | 55-73374 | 6/1980 |
| JP | 63-122522 A | 5/1988 |

* cited by examiner

*Primary Examiner*—Edward Lefkowitz
*Assistant Examiner*—Andre Allen
(74) *Attorney, Agent, or Firm*—David S. Safran

(57) ABSTRACT

A ceramic pressure measurement cell for use in a sensor for static and/or dynamic monitoring of the pressure of a liquid or flowable medium which includes a base body and a membrane connected to the base body such that one side of the membrane is in contact with the medium to be monitored. The pressure measurement cell has high chemical resistance and high temperature resistance for a plurality of chemicals which is achieved by applying at least one plastic film on the side of the membrane in contact with the medium.

30 Claims, 4 Drawing Sheets

SENSOR, MEASUREMENT CELL FOR USE IN A SENSOR AND A PROCESS FOR PRODUCING A MEASUREMENT CELL

BACKGROUND OF THE INVENTION

1. Field of the Invention

The invention relates to a sensor for static and/or dynamic monitoring of at least one physical quantity of a liquid or flowable medium, and particularly relates to a pressure sensor with a housing and a measurement cell in which one side of the measurement cell is in contact with the medium to be monitored. The measurement cell converts the physical quantity which is to be monitored into a proportional measurement signal. In addition, the invention relates to a measurement cell, especially a ceramic pressure measurement cell for use in a sensor in which the measurement cell has a base body and a membrane which is connected to the base body such that one side of the membrane is in contact with the medium to be monitored. The invention is also drawn to a process for producing a measurement cell.

2. Description of Related Art

Conventionally, sensors used for monitoring of a medium or the property of a medium acquire a physical measurement value and then convert this measurement value into an electrical signal which is then relayed to a central evaluation unit, which is connected to one or more sensors via electrical lines, or to a decentralized evaluation unit which is directly connected to the sensor. Sensors, often called fluid sensors, generally have an electronic unit in which the measured values, which have been delivered from the measurement cell, are converted and, optionally, processed or evaluated.

For these sensors there are a plurality of applications. Thus, for example, the pressure, the temperature, the fill level, the flow rate or the flow amount of liquid or solid media, as well as a bulk material, can be monitored or measured. There are different measurement principles for determining the individual parameters. For example, fill level sensors can work using the capacitive or the hydrostatic measurement principle.

Pressure sensors are used to monitor and measure the system pressure in hydraulic and pneumatic applications. In such a system, the pressure to be monitored can also be a negative pressure so that the sensors are instead vacuum sensors. One application of these pressure sensors is, for example, in the foodstuffs industry in which the pressure of various media, especially various liquids, is monitored or measured. For the instant invention, there are a plurality of different embodiments, depending on the application, with the structure and the design of the pressure sensors differing depending on the expected maximum nominal pressure and the type of medium which is to be monitored.

Known pressure sensors conventionally have a cylindrical pressure measurement cell which includes a base body and a membrane which are held at a defined distance from one another and are tightly, hermetically joined to one another by a connecting material, e.g., a brazing solder. Then, the side of the membrane in contact with the medium to be monitored undergoes a deflection which is proportional to the pressure of the medium and which can be detected by means of an electromechanical converter which is located on the other side of the membrane, see for example German Application Nos. 44 16 978 C2 or 196 28 551 A1 which corresponds to U.S. Pat. No. 5,824,909.

In the first type of pressure sensors, the capacitive measurement principle is used as the measurement principle. Specifically, the inner surfaces of the membrane and the base body are coated with electrodes to form a measurement capacitor with a capacitance which is a function of the camber of the membrane, i.e., a measure for the pressure on the membrane. In practice, pressure measurement cells of a ceramic material are generally used since such cells have high measurement accuracy which remains stable over a very long time. On the side facing away from the medium, the pressure measurement cell has an electronic circuit which converts the capacitance of the measurement capacitor into an electrical signal dependent on pressure and makes the signal accessible to further processing or display via electrical connecting leads.

In addition to these pressure sensors, which employ the capacitive measurement principle and include two electrodes used as the electromechanical converter, there are also pressure sensors which have resistance strain gauges (DMS) or pressure-sensitive resistors or DMS resistors. In these pressure sensors, the DMS resistors are applied to the side of the membrane facing away from the medium and the resistance value of the DMS resistors depends on the camber of the membrane. Therefore, the resistance is a measure of the pressure on the membrane. In these pressure sensors or pressure measurement cells, a separate base body opposite the membrane is not necessary in terms of measurement engineering. Therefore, there are pressure sensors or pressure measurement cells with DMS resistors which are monolithic, i.e., the base body and the membrane are constructed in one piece. In this embodiment, the membrane is generally on the side of the base body which has a blind hole in the area of the membrane, which side faces away from the membrane. The base body has a pot-shape with the bottom of the pot being formed by the membrane and the open side of the pot facing the membrane. In addition, it is also possible for the membrane to be located on the side of the base body facing the medium.

Regardless of the type of measurement principle of the pressure sensor, in the known pressure sensors there is quite often the problem that the membrane and the measurement cell must necessarily come into contact with the medium which is to be monitored. Therefore, for corrosive media the known sensors cannot be used or can only be used at great cost. The problem is that such measurement cells have only limited resistivity to the corrosive media, such as sodium hydroxide solution, phosphoric acid, sulfuric acid or chromic acid, particularly when such cells are used in conjunction with an elevated temperature of the corrosive medium.

In the prior art, various attempts have been made to avoid the aforementioned disadvantages. One possibility for increasing the resistivity of a ceramic measurement cell to a medium is to use a measurement cell of high-purity ceramic. Conventional, relatively economical measurement cells consist of 96% ceramic which does meet the normal mechanical stresses of the measurement cell, but has only limited media resistivity to the corrosive medium. The resistivity of the measurement cell to the corrosive media can be increased by using a high-purity ceramic, for example 99.9% ceramic or sapphire ceramic. However, these measurement cells are relatively expensive so that they are only worthwhile in special individual cases.

German Patent 36 29 628 C2, which corresponds to U.S. Pat. No. 4,617,607, and German Patent 39 12 217 C2, which corresponds to U.S. Pat. No. 5,076,147, disclose pressure sensors in which on the side of the membrane facing the medium a thin metal membrane is pretensioned or a silicon carbide layer is applied to the membrane. When using an additional metal membrane it is disadvantageous in that the metal membrane changes the deflection characteristic and, therefore, the sensitivity of the sensor so that the use of a metal membrane in pressure sensors is not suited for a relatively low nominal pressure. When a layer of silicon carbide is applied, by means of gas phase deposition, a problem arises in that deposition of silicon carbide occurs at very high temperatures of roughly 1000° C. which can lead to damage to the membrane or the measurement cell. In addition, in the known coating process there is also the danger that the layer of silicon carbide has individual pores such that reliable protection of the membrane is not ensured. The problem of the occurrence of pores in the layer of silicon carbide particularly acute when a relatively thin layer is desired.

SUMMARY OF THE INVENTION

Therefore the object of this invention is to provide a sensor or a measurement cell which has high chemical resistance and high temperature resistance for a plurality of chemicals so that the sensor or the measurement cell can be used for a plurality of application cells. Additionally, a process will be provided with which a corresponding measurement cell can be produced easily and economically.

The aforementioned object is achieved in a first embodiment by applying on the side of the measurement cell or the membrane facing the medium at least one plastic film. The use of a plastic film has the advantage that the film does not influence the sensitivity of the sensor or measurement cell or does so only to an insignificant degree. In this embodiment, different plastic films with the desired chemical resistance and high temperature resistivity as well as the desired small thickness are available and can be employed. Applying a plastic film to the measurement cell thus results in that the measurement cell continues to be functionally in contact with the medium which is to be monitored, but is no longer directly in contact with the corrosive medium so that the measurement cell is not attacked by the corrosive medium. Advantageously, the plastic film is composed of a fluorine-containing plastic, particularly polytetrafluoroethylene (PTFE), perfluoroalkoxy polymer (PFA), tetrafluoroethylene-perfluoromethylvinylether copolymer (MFA) Tefzel, ethylene chlorotrifluoroethylene (ECTFE) and Halar or polychlorotrifluoroethylene (PCTFE).

The plastic film can be cemented on the measurement cell or the membrane, but the problem with this method of attachment is that the plastic films described above have a very low adhesive capacity and the temperature resistance of the available cements is generally inadequate. According to one preferred embodiment, the sensor or measurement cell has the plastic film melted coated on the side of the measurement cell or the membrane facing the medium. Usually the plastic films used have a melting point which is generally much higher than the maximum temperature of the medium to be monitored, and, therefore, by melt coating the plastic film a permanent connection between the plastic film and the side of the measurement cell or membrane can be achieved.

In another embodiment, it is particularly advantageous to not only apply one plastic film, but at least two plastic films. In this embodiment, the second plastic film is melted onto the first plastic film. This will reduce the likelihood that the measurement cell will be damaged due to pores, through which then the corrosive medium can pass, exist in the plastic film. Further, the adhesion of the plastic films to the measurement cell can be improved by selection of the two compatible plastic films. That is, the two plastic films are employed have slightly different melting points, with the first plastic film, which is melted onto the measurement cell or membrane, having a lower melting point than the second plastic film melted on the first plastic film. In this embodiment, the first plastic film is therefore used as a type of adhesive layer for the second plastic film. This is especially advantageous in the production of the measurement cell of the invention, as is detailed below.

In an alternative embodiment, a thin metal foil, composed of special steel or of tantalum, can be applied to the first plastic film. In this embodiment, a sensor or a measurement cell can be made available which is mechanically especially durable and which can also be used for abrasive media.

A preferred process for producing a measurement cell of the invention includes heating the measurement cell to a temperature $T_{H1}$ and then at least one plastic film is melted on the first side of the measurement cell. Preferably, the measurement cell is heated to a temperature $T_{H1}$ which is less than the melting point of the plastic film, and then to melt the plastic film on the first side of the measurement cell the plastic film is heated using a separate heat source. The heat source is preferably a heated die which simultaneously heats and presses the plastic film against one side of the measurement cell. Further, instead of a "hot" heated die a relatively "cool" die can be used, i.e. a pressure plate can be used, the pressure plate having openings through which the plastic film is heated by means of radiation.

According to one preferred embodiment of the process of the invention, the plastic film is applied under a vacuum to the first side of the heated measurement cell. In this way, the plastic film is "sucked" onto the heated measurement cell, by which bubble-free contact of the plastic film is ensured. If, according to the preferred embodiment, two plastic films are melted onto the measurement cell, the second plastic film is also applied to the first plastic film under a pressure differential from a vacuum. Applying the plastic films under a vacuum, by which bubble-free resting of the plastic film on the measurement cell is ensured, prevents small bubbles from bursting under pressure and thus prevents pores from formed in the plastic film.

Alternatively, instead of two individual plastic films one multi-layer film of at least two layers can be applied to the measurement cell. The use of such a multi-layer film has the advantage of easier handling. Further, the method of production has the advantage that possible air inclusions between the two plastic films can be better avoided than when the two plastic films are melted onto the measurement cell in succession. For the multi-layer film essentially the same materials can be used as are used for the two individual plastic films.

Preferably, the plastic films are formed by applying a thin metal foil to the second plastic film after "vacuum sucking" the first plastic film onto the heated measurement cell and after "vacuum sucking" the second plastic film onto the first plastic film. Then, the first plastic film and the second plastic film are heated by means of a heated die to a temperature $T_{H2}$ which is above the melting point of the first plastic film, but below the melting point of the second plastic film. By melt coating the first plastic film secure attachment of the first plastic film to the measurement cell and at the same time a permanent connection of the two plastic films to one another are achieved. Using the second plastic film of a somewhat higher melting point ensures that the second plastic film does not adhere to the heated die.

The possibility of adhesion to the heated die is further reduced by using an additional thin metal foil. The metal foil prevents the first plastic film from being pulled off the measurement cell when the heated die is lifted. Thus the metal foil enables simple lifting of the heated die without damage to the intended connection of the two plastic films to one another and connection of the first plastic film to the measurement cell. In addition, the metal foil as a result of its good thermal conductivity and its low thickness ensures prompt and uniform transport of the heat of the heated die to the plastic film. The metal foil is preferably an aluminum foil with a thickness of approximately 10 microns to 100 microns.

The measurement cell of the invention, especially a pressure measurement cell, is produced according to one preferred embodiment by the following steps:

heating of the measurement cell to a temperature $T_{H1}$.

application of the first plastic film under a vacuum pressure differential to the heated measurement cell.

application of the second plastic film under a vacuum pressure differential to the first plastic film.

application of a thin metal foil under a vacuum pressure differential to the second plastic film.

pressing a heated die against the metal foil and heating the plastic films to a temperature of $T_{H2}$.

lifting of the heated die off the metal foil, with the metal foil remaining adhered to the second plastic film.

pulling the thin metal foil off the second plastic film after the measurement cell cools.

In the above described process, the first plastic film is for example of PFA or MFA and the second plastic film is PTFE, the first plastic film having a melting point $T_{S1}$ of roughly 305° C. (PFA) or roughly 290° C. (MFA) and the second plastic film having a melting point $T_{S2}$ of roughly 325° C. The temperature $T_{H1}$ to which the measurement cell is heated is roughly 200° C. and the temperature $T_{H2}$ of the heated die is roughly 320° C. or roughly 300° C., the duration of pressing of the heated die being roughly one minute.

If the process is carried out with the parameters given above, the plastic films can be melted onto a measurement cell which is then ready to install. For an installable measurement cell, i.e. a measurement cell which is already provided with the electromechanical converter and the electrical leads, the process temperature is determined by the temperature resistance of the electrical leads, especially the epoxy-conductive cement connections of the terminal pins. Therefore a much higher temperature $T_{H1}$ than 200° C. is generally not permissible when the measurement cell is being heated. If, conversely, the plastic films are melted onto the membrane before completion of the measurement cell, the membrane can be heated to a temperature $T_{H2}$ which is sufficient for melting the first plastic film onto the membrane. Since, in this later embodiment, there is the danger that the plastic film will be damaged during production process of the measurement cell, generally melting the plastic films onto a measurement cell that has already been prepared for installation is preferred.

When the plastic films or the multi-layer film is pressed onto the measurement cell using the heated die, there is the possibility that the measurement cell will deflect to the inside, especially in the middle. On the one hand, this influences the uniform application of a plastic film on the measurement cell, but also can lead to undesirable pretensioning of the measurement cell.

In one process for solving this problem, there are holes in the measurement cell, i.e. in the base body, so that the membrane can be exposed to compressed air from "behind" and then the membrane can "bulge" in the direction to the heated die. The counter pressure which is applied by the heated die to the membrane allows the membrane to be exposed to a pressure which is above the actual (free) allowable loading pressure. By this process, unwanted flexing of the membrane during pressing of the plastic film can be counteracted and, at the same time, the plastic film can be pressed onto the membrane with a higher pressure such that the adhesion of the plastic film is improved.

This invention will be detailed with reference to pressure sensors. However, the invention is not limited to this type of sensor. Rather the invention can be used in all types of sensors in which the measurement cell comes into contact with the medium which is to be monitored.

In particular there is now a plurality of possibilities for embodying and developing the sensor, the measurement cell and the process of the invention. To do this, reference is made to the description of preferred embodiments in conjunction with the drawings.

DETAILED DESCRIPTION OF THE INVENTION

Figure 1:
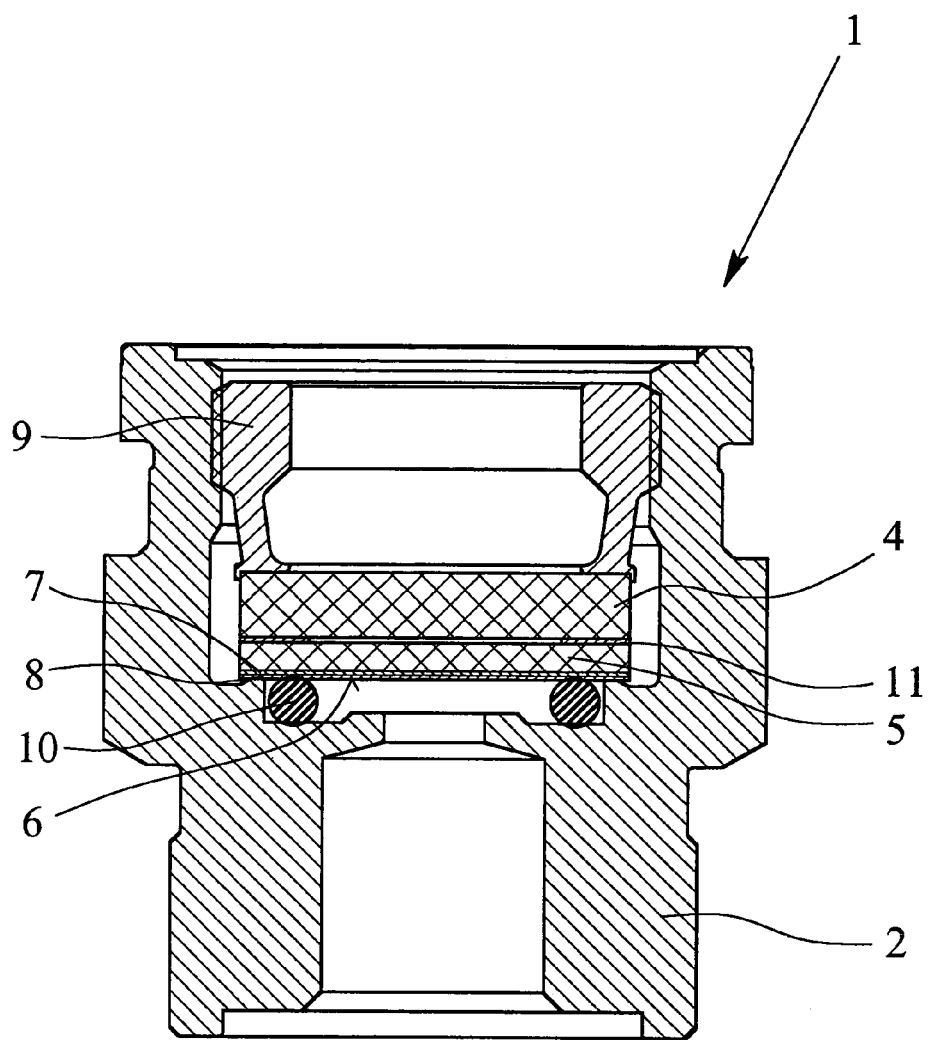
FIG. 1 shows, in a section, a simplified representation of a first embodiment of the sensor of the invention.

As an embodiment of the sensor of the invention the figures show only one pressure sensor 1, with a housing 2 and with a measurement cell 3, the measurement cell 3 accordingly being a pressure measurement cell. The measurement cell 3 shown in the figures includes a base body 4 and a membrane 5 which is connected to the base body 4, the measurement cell 3 being located in the housing 2 such that one side 6 of the membrane 5 is in contact with the medium to be monitored. In this way, the membrane 5 experiences a deflection which is proportional to the pressure of the medium, which is detected by means of an electromechanical converter (not shown) located on the other side of the membrane 5 facing away from the medium, and using an electronic circuit (not shown) is converted into a proportional output signal. The electromechanical converter can be electrodes located on the inside surfaces of the base body 4 and of the membrane 5 or can be DMS resistors or resistance strain gauges located on the inside surface of the membrane 5.

In order to increase the resistance to a corrosive medium of the membrane 5 which is preferably composed, like the base body 4, of a ceramic, e.g., aluminum oxide, a plastic film 7 is melted on the side 6 of the membrane 5 facing the medium. A second plastic film 8 is melted onto the plastic film 7 which is for example of PFA or MFA and has a thickness from roughly 5 microns to 50 microns, and preferably a thickness of 20 microns to 30 microns. The second plastic film 8 is composed preferably of PTFE and likewise has a thickness of roughly 20 microns to 30 microns. Since the first plastic film 7 has a somewhat lower melting point ($T_{S1} \approx 305°$ C. or $T_{S1} \approx 290°$ C.) than the second plastic film 8 ($T_{S2} \approx 325°$ C.) the first plastic film 7 acts a type of adhesive film for the second plastic film 8.

Figure 2:
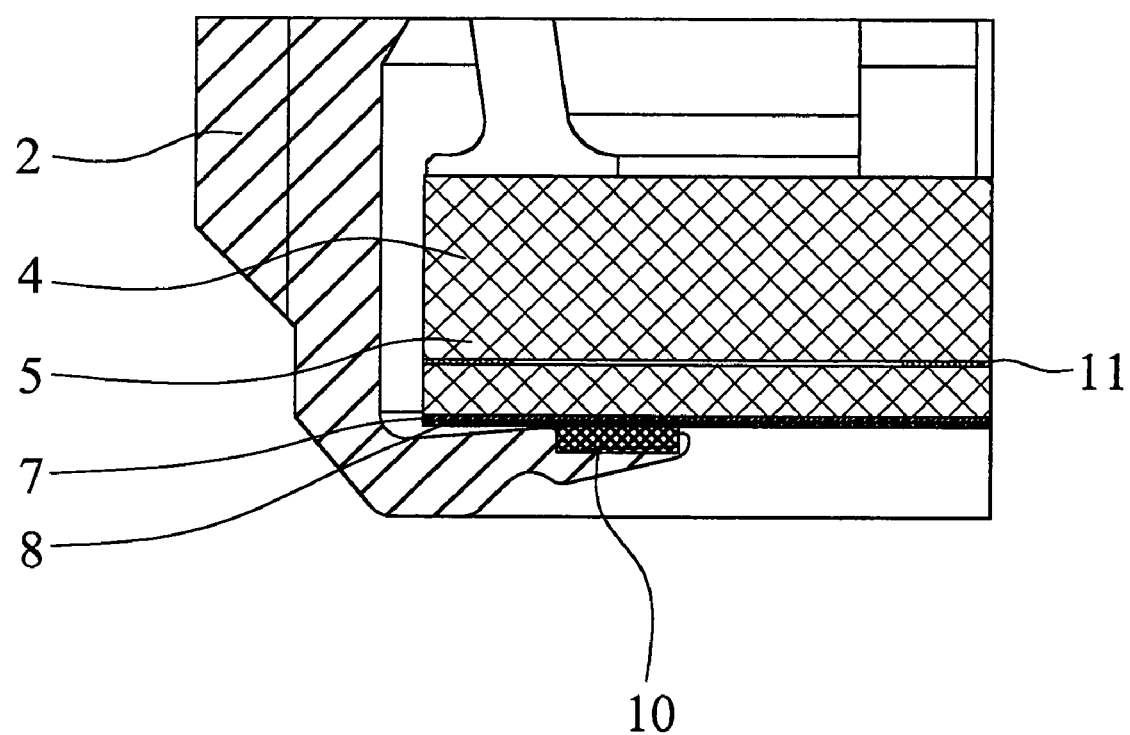
FIG. 2 shows, in a section, an enlargement of the measurement cell of the sensor in FIG. 1.

As can be taken from FIGS. 1 and 2, the pressure measurement cell 3 is mounted in the housing 2 using a support ring 9, the pressure measurement cell 3 on the side 6 facing the medium being sealed by means of a seal 10, and the seal 10 at the same time being used as a support for the pressure measurement cell 3. The seal 10 is preferably of the same material as the second plastic film 8. The tight connection between the base body 4 and the membrane 5 is implemented using solder 11, particularly glass solder. The solder is formed in the shape of a circular ring so that the edge of the base body 4 is joined, via the solder 11, to the edge of the membrane 5, while the middle surface of the membrane 5 which is used as the measurement surface has a defined distance to the base body 4. In this way, a deflection of the membrane 5 proportional to the pressure of the medium to be measured is ensured.

Instead of the second plastic film 8, a thin metal foil can also be applied to the first plastic film 7, by which the mechanical resistance of the measurement cell is further increased. The metal foil can be melted directly onto the first plastic film 7 or can be joined to the first plastic film 7 by heating.

Figure 3A:
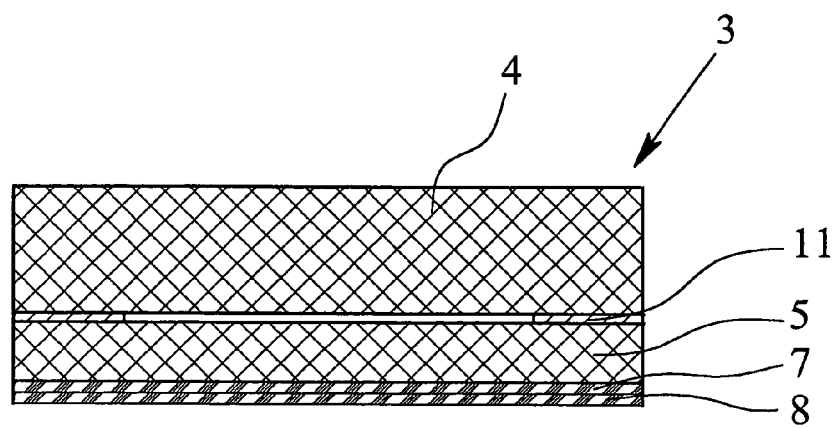
FIG. 3 shows a measurement cell of the invention in the finish-mounted state and in the pre-mounted state.
Figure 3B:
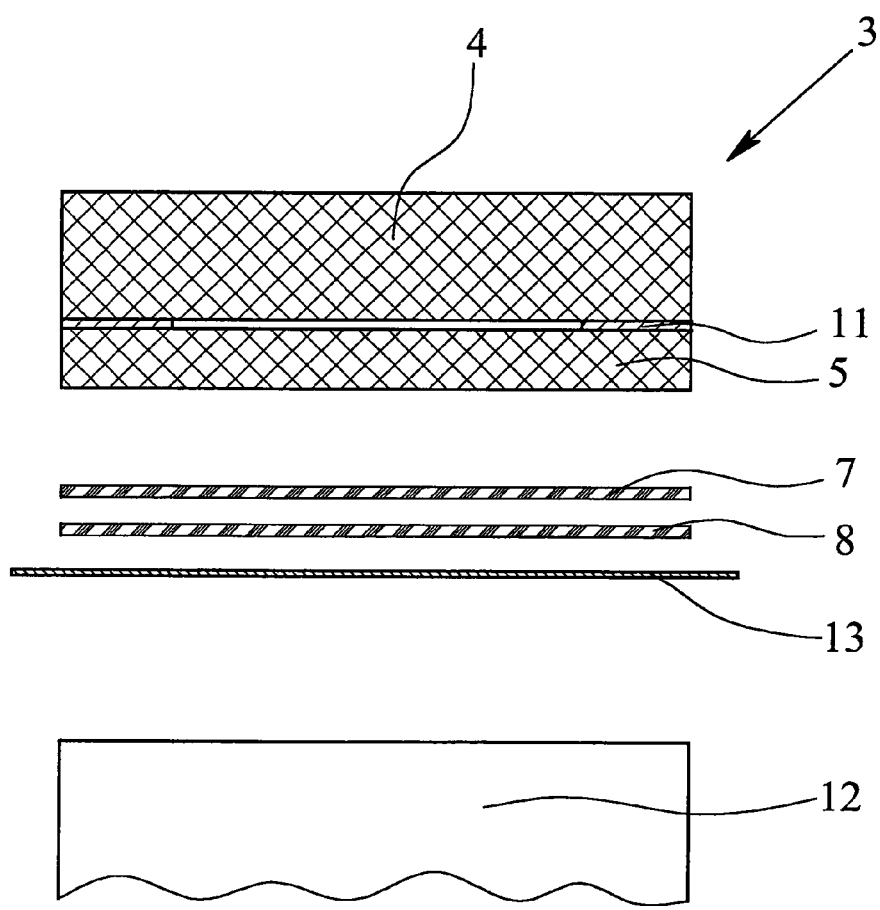

FIG. 3 schematically shows the tip of the heated die 12 and a metal foil 13 in the not yet completely mounted state (FIG. 3b) of the pressure measurement cell 3. In the preferred process, after applying the two plastic films 7, 8 to the membrane 5, the metal foil 13 is placed on the plastic film 8 and then the heated die 12 is pressed against the metal foil 13. The heated die 12 thus presses via the metal foil 13 against the two plastic films 7 and 8 and heats them to a temperature at which the first plastic film melts on and thus produces a strong connection both to the membrane 5 and also to the second plastic film 8. After the plastic films 7 and 8 are melted onto the measurement cell 3, the heated die 12 is lifted with the metal foil 13 preventing the adhesion of the plastic film 8 to the heated die 12. After the measurement cell 3 cools the metal foil 13 withdrawn which produces an especially smooth and pore-free surface on the plastic film 8.

When the plastic films 7, 8 are pressed onto the measurement cell 3 using the heated die 12 there is the danger that the measurement cell 3, especially in the middle, will deflect to the inside. While this influences the uniform application of the plastic films 7, 8 to the measurement cell 3, unwanted pre-tensioning of the measurement cell 3 also can occur.

One embodiment for solving this problem is that there are holes 14 in the measurement cell 3 so that the membrane 5 is exposed to compressed air from "behind" and thus the membrane 5 "bulges" in the direction to the heated die 12. The counter pressure, which is applied by the heated die 12 to the membrane 5, permits application of a pressure to the membrane 5 which lies above the actual (free) allowable loading pressure.

Figure 4A:
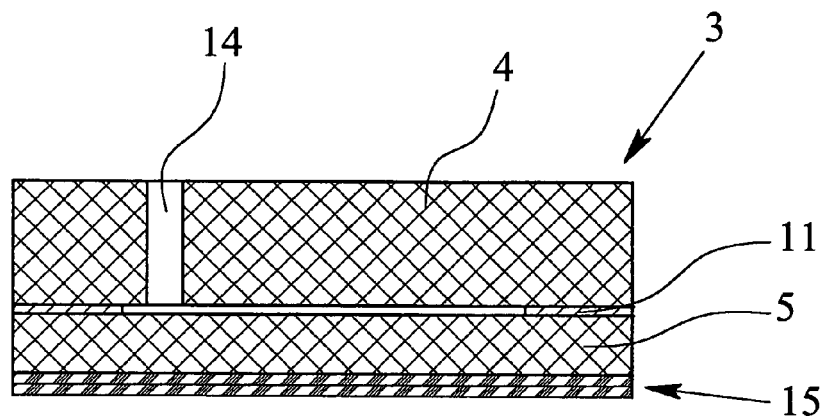
FIG. 4 shows another measurement cell in the finish-mounted state and in the pre-mounted state.
Figure 4B:
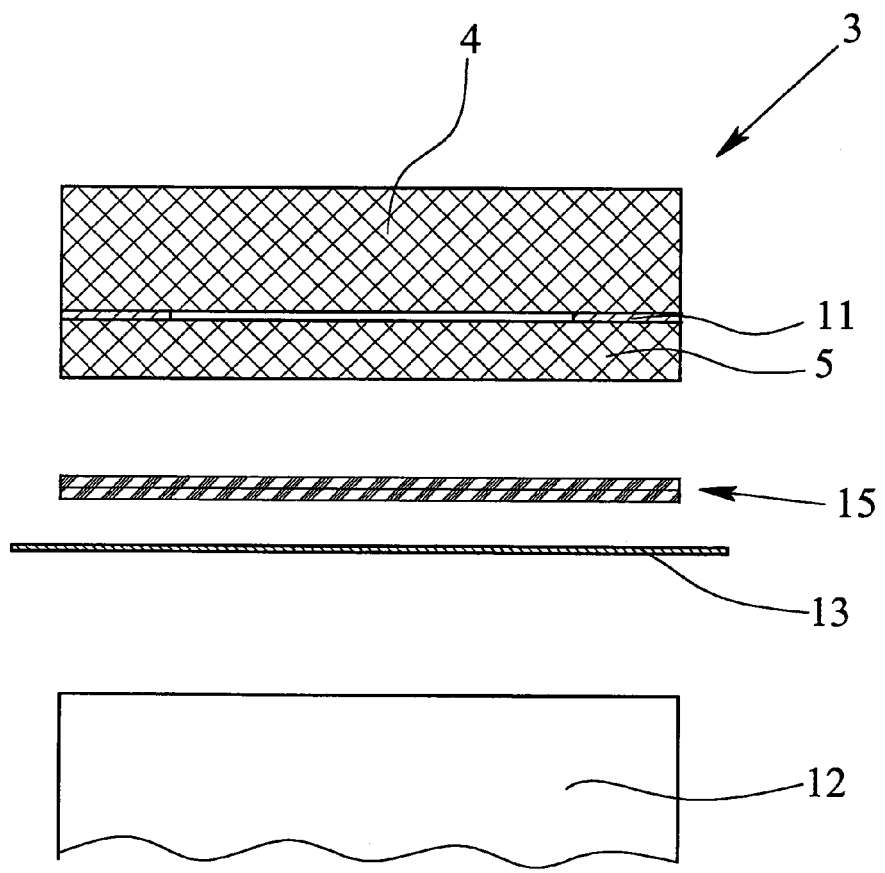

Additionally, FIG. 4 shows that instead of two individual plastic films 7, 8, a multi-layer film 15 composed of at least two plastic layers can be used. By using this "composite film" the danger of air inclusions between individual layers is further reduced and melting-on under a vacuum pressure differential can be at least partially removed for the second plastic film.

What is claimed is:

1. A pressure sensor for static and/or dynamic monitoring of at least one physical quantity of a liquid or flowable medium comprising:
   a housing; and
   a ceramic pressure measurement cell in which a side of the ceramic pressure measurement cell is adapted to face the medium to be monitored, and in which the ceramic pressure measurement cell is adapted to convert the at least one physical quantity to be monitored into a proportional measurement signal,
   wherein at least one thin plastic film is applied to the side of the ceramic pressure measurement cell facing the medium in a manner separating the ceramic pressure measurement cell from direct contact with the at least one liquid or flowable medium without influencing the sensitivity of the measurement cell to the pressure of the at least one liquid or flowable medium to a significant degree.

2. The sensor as set forth in claim 1, wherein the at least one plastic film has been attached to the side of the measurement cell facing the medium by melt coating.

3. The sensor as set forth in claim 1, wherein the at least one plastic film comprises a second plastic film attached to a first plastic film by melt coating.

4. The sensor as set forth in claim 3, wherein the two plastic films have different melting points such that the first plastic film has a lower melting point than the second plastic film.

5. The sensor as set forth in claim 1, wherein the measurement cell has a round shape and is clamped in the housing such that the measurement cell is sealed on the side facing the medium.

6. The sensor as set forth in claim 5, further comprising a seal, wherein the seal is composed of the same material as the plastic film which is composed of a fluorine-containing polymer plastic.

7. The sensor as set forth in claim 1, wherein a thin metal foil composed of special steel or tantalum is applied on the at least one plastic film.

8. A ceramic pressure measurement cell for use in a sensor for static and/or dynamic monitoring of at least one physical quantity of a liquid or flowable medium comprising:
   a base body; and
   a membrane which is connected to the base body such that a side of the membrane is adapted to face the medium to be monitored,
   wherein at least one thin plastic film is applied on said side of the membrane so as to completely cover said side without influencing the sensitivity of the membrane to the pressure of the at least one liquid or flowable medium to a significant degree.

9. The measurement cell as set forth in claim 8, wherein the at least one plastic film has been attached to the side of the measurement cell facing the medium by melt coating.

10. The measurement cell as set forth in claim 8, wherein the at least one plastic film comprises a second plastic film attached to a first plastic film by melt coating.

11. The measurement cell as set forth in claim 10, wherein the two plastic films have different melting points such that the first plastic film melted on the membrane has a lower melting point than the second plastic film melted on the first plastic film.

12. The measurement cell as set forth in claim 8, wherein the at least one plastic film comprises a fluorine-containing plastic selected from the group consisting of polytetrafluoroethylene (PTFE), perfluoroalkoxy polymer (PFA), or tetrafluoroethylene-perfluoromethylvinylether copolymer (MFA).

13. The measurement cell as set forth in claim 11, wherein the first plastic film is composed of either perfluoroalkoxy polymer (PFA) or tetrafluoroethylene-perfluoromethylvinylether copolymer (MFA) and the second plastic film is composed of polytetrafluoroethylene (PTFE).

14. The measurement cell as set forth in claim 8, wherein the at least one plastic film is a preformed multi-layer film comprising at least two plastic layers.

15. The measurement cell as set forth in claim 8, wherein a thin metal foil composed of special steel or tantalum is applied on the at least one plastic film.

16. The measurement cell as set forth in claim 8, wherein the base body and the membrane are composed of a ceramic material selected from the group consisting of aluminum oxide, glass, quartz and sapphire.

17. The measurement cell as set forth in claim 8, wherein in order to perform static and/or dynamic pressure measurement, the membrane in operation undergoes a deflection proportional to the pressure of the medium, and wherein an electromechanical converter is positioned on the side of the membrane facing away from the medium.

18. The measurement cell as set forth in claim 8, wherein between the base body and the membrane there is a connecting material which joins the base body and the membrane to one another at least on an edge of the base body and membrane.

19. The measurement cell as set forth in claim 8, wherein the base body and the membrane are made formed as a single piece, wherein the base body has a blind hole in the area of the membrane.

20. The measurement cell as set forth in claim 16, wherein the base body and the membrane are composed of the same material.

21. A process for producing a ceramic pressure measurement cell for a sensor for static and/or dynamic monitoring of at least one physical quantity of a liquid or flowable medium in which the measurement cell includes a membrane which is connected to a base body such that one side of the membrane is adapted to be face the medium to be monitored, comprising the steps of:

heating the ceramic pressure measurement cell to a temperature $T_{H1}$ which is lower than the melt temperature of an at least one plastic film; and then applying the at least one thin plastic film on said side of the membrane by melting so as to completely cover said side.

22. The process as set forth in claim 21, wherein the step of applying the at least one plastic film comprises applying a second plastic film by melt bonding onto a first plastic film which was melted on said side of the membrane.

23. The process as set forth in claim 22, wherein either or both of the first plastic film or the second plastic film is applied under a vacuum differential pressure to either the side of the membrane away from the medium or on a side of the first plastic film away from the medium.

24. The process as set forth in claim 21, wherein at least the at least one plastic film is heated by means of a heated die which is pressed against the membrane.

25. The process as set forth in claim 22, wherein the at least one plastic film is a preformed multi-layer film comprising at least two plastic film layers wherein the multi-layer film is applied by melting on said side of the membrane.

26. The process as set forth in claim 21, wherein during the melting of the at least one plastic film onto said side of the membrane a side of the membrane away from the medium is exposed to an elevated pressure through a hole in the base body.

27. The process as set forth in claim 24, wherein a thin metal foil of either special steel or tantalum is placed between the at least one plastic film and the heated die.

28. The process as set forth in claim 27, wherein the at least one plastic film includes a first plastic film and a second plastic film or is composed of a preformed multi-layer plastic film and the method further comprises the steps of:

applying the thin metal foil to the second plastic film or multi-layer film; and then heating the second plastic film or the multi-layer film by means of the heated die to a temperature $T_{H2}$ at which the first plastic film or surface of the multi-layer film adjacent the membrane is melted while the second plastic film or surface of the multi-layer film removed from the membrane surface is not melted.

29. The process as set forth in claim 28, wherein after heating and pressing the heated die is removed while the metal foil remains on the second plastic film or multi-layer film and after cooling of the membrane the metal foil is removed from the second plastic film or the multi-layer film.

30. The process as set forth in claim 21, wherein a thin metal foil composed of special steel or tantalum is applied onto a surface of the at least one plastic film away from the membrane prior to the step of applying the at least one plastic film to the membrane.

* * * * *